US011829848B2

(12) United States Patent
Hu et al.

(10) Patent No.: US 11,829,848 B2
(45) Date of Patent: Nov. 28, 2023

(54) ADDING NEGATIVE CLASSES FOR TRAINING CLASSIFIER

(71) Applicant: Microsoft Technology Licensing, LLC, Redmond, WA (US)

(72) Inventors: Yuxiao Hu, Redmond, WA (US); Lei Zhang, Redmond, WA (US); Christopher J Buehler, Redmond, WA (US); Anna Roth, Redmond, WA (US); Cornelia Carapcea, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1024 days.

(21) Appl. No.: 15/617,703

(22) Filed: Jun. 8, 2017

(65) Prior Publication Data
US 2018/0330273 A1 Nov. 15, 2018

Related U.S. Application Data

(60) Provisional application No. 62/503,593, filed on May 9, 2017.

(51) Int. Cl.
*G06N 20/00* (2019.01)
*G06F 18/24* (2023.01)
*G06F 18/214* (2023.01)
*G06V 10/764* (2022.01)
*G06V 10/774* (2022.01)

(52) U.S. Cl.
CPC ........... *G06N 20/00* (2019.01); *G06F 18/214* (2023.01); *G06F 18/24* (2023.01); *G06V 10/764* (2022.01); *G06V 10/774* (2022.01)

(58) Field of Classification Search
CPC ........ G06N 20/00; G06N 20/10; G06N 20/20; G06N 3/03; G06N 3/04; G06N 5/04; G06N 3/088; G06K 9/6256; G06K 9/624; G06K 9/629; G06K 9/6292; G06K 9/6293; G06K 9/626; G06K 9/6267; G06K 9/627
USPC .................................... 706/1, 12, 19, 20, 21
See application file for complete search history.

(56) References Cited

U.S. PATENT DOCUMENTS

| 5,796,863 A | 8/1998 | Lyon |
| 8,725,660 B2 | 5/2014 | Forman et al. |
| 2016/0321678 A1* | 11/2016 | Wong ................. G06Q 30/0201 |
| 2016/0335521 A1* | 11/2016 | Jiang .................... G06V 10/764 |

(Continued)

OTHER PUBLICATIONS

Sample size plaining for classfication models (Year: 2012).*

(Continued)

*Primary Examiner* — Tsu-Chang Lee
(74) *Attorney, Agent, or Firm* — Schwegman Lundberg & Woessner, P.A.

(57) ABSTRACT

A method includes obtaining training data for a classifier, the training data comprises one or more target classes, obtaining candidate background classes, selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes, and training the classifier on a combined set of the selected negative classes and target classes.

20 Claims, 4 Drawing Sheets

(56) References Cited

U.S. PATENT DOCUMENTS

| 2016/0365096 | A1 | 12/2016 | Bocklet et al. | |
|---|---|---|---|---|
| 2017/0039469 | A1 | 2/2017 | Majumdar et al. | |
| 2017/0061322 | A1* | 3/2017 | Chari | G06N 20/20 |
| 2018/0068231 | A1* | 3/2018 | Sharma | G06N 20/00 |
| 2018/0247107 | A1* | 8/2018 | Murthy | G06V 10/454 |
| 2018/0307741 | A1* | 10/2018 | Kida | G06N 20/00 |

OTHER PUBLICATIONS

Algorithm and Tool for Automated Ontology Merging and Alignment (Year: 2000).*

Sample size planning for classification models (Year: 2012).*

Lin et al., "Class-imbalanced classifiers for high-dimensional data", Briefings in Bioinformatics, vol. 14, No. 1, 13-26, Mar. 9, 2012 (Year: 2012).*

"Training the Classifier", https://docs.marklogic.com/guide/search-dev/classifier, Retrieved on: May 22, 2017, 12 pages.

Forman, et al., "Learning from Little: Comparison of Classifiers Given Little Training", In Proceedings of European Conference on Principles of Data Mining and Knowledge Discovery, Sep. 20, 2004, pp. 1-14.

Yousef, et al., "Learning from positive examples when the negative class is undetermined- microRNA gene dentification", In Proceedings of Algorithms for Molecular Biology, vol. 3, No. 2, Jan. 28, 2008, 9 pages.

Toth, Robert, "Selecting Negative Examples for Training an SVM Classifier", In Master Thesis of Lund University, 2011, 69 pages.

\* cited by examiner

ADDING NEGATIVE CLASSES FOR TRAINING CLASSIFIER

RELATED APPLICATION

This application claims priority to U.S. Provisional Application Ser. No. 62/503,593 (entitled Adding Negative Classes for Training Classifier, filed May 9, 2017) which is incorporated herein by reference.

BACKGROUND

When a customer or user trains a classifier, the classifier can only recognize the known classes, since the classifier is only trained on provided data. Thus, the accuracy of the classifier is limited. When a random image is submitted to the classifier, the result can be unexpected. For example, if a classifier trained on dog images receives a human face to classify, the classification results can be unpredictable and sometimes embarrassing, as the human face may be classified as a dog.

SUMMARY

A method includes obtaining training data for a classifier, the training data comprises one or more target classes, obtaining candidate background classes, selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes, and training the classifier on a combined set of the selected negative classes and target classes.

A device includes a processor and a memory device coupled to the processor and having a program stored thereon for execution by the processor to perform operations. The operations include obtaining training data for a classifier, the training data comprises one or more target classes, obtaining candidate background classes, selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes, and training the classifier on a combined set of the selected negative classes and target classes.

A machine readable storage device has instructions for execution by a processor of a machine to cause the processor to perform operations. The operations include obtaining training data for a classifier, the training data comprises one or more target classes, obtaining candidate background classes, selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes, and training the classifier on a combined set of the selected negative classes and target classes.

DETAILED DESCRIPTION

Figure 1:
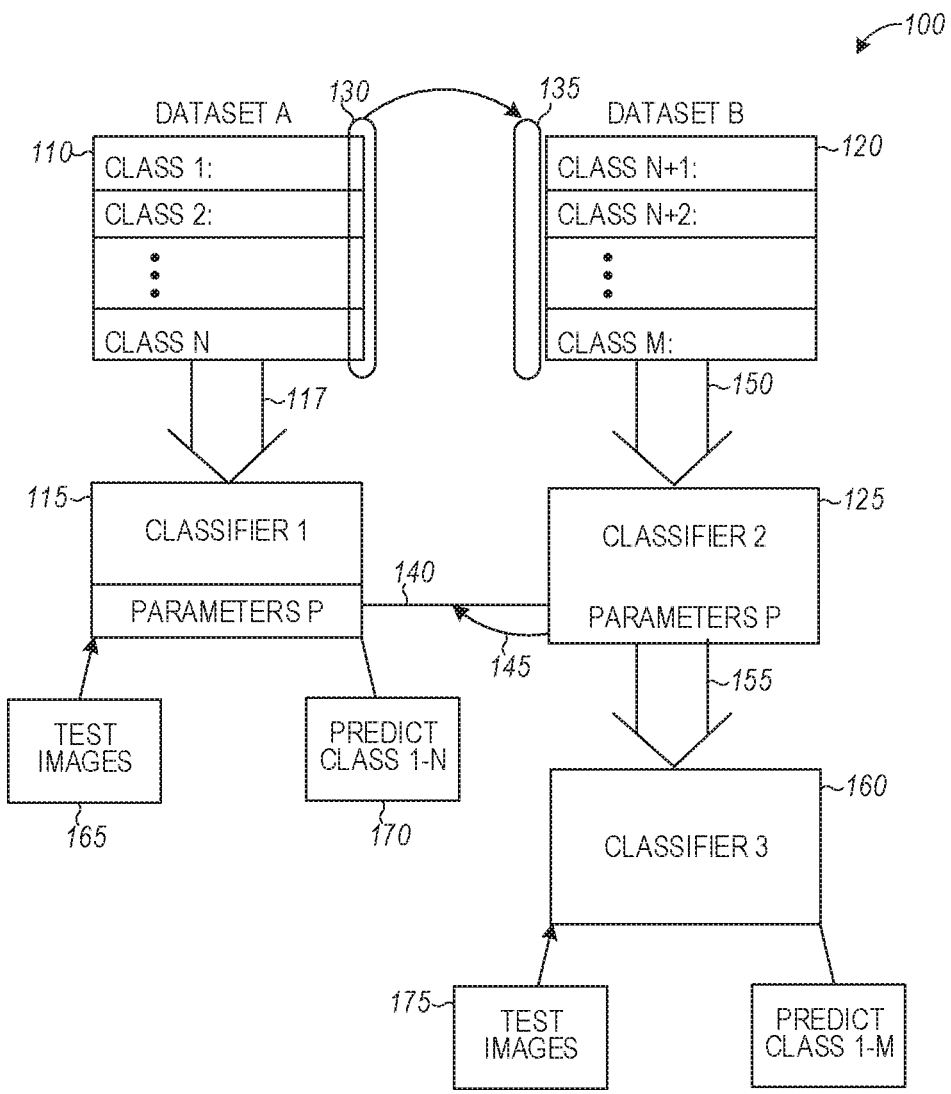
FIG. 1 is a block flow diagram illustrating a method of classifier training and the addition of a class to a trained classifier according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program. a function, a subroutine, a computer, or a combination of software and hardware. The term. "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media. may additionally include communication media such as transmission media for wireless signals and the like.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

A computer vision model may be created with training images provided by a customer. One example vision model may be created to recognize two different classes, such as cats and dogs. The customer provides training images containing cats and dogs to create the model. The model is used as a classifier to recognize images that may be provided by the customer once the model has been trained.

In various embodiments, the model may be efficiently extended, leveraging the existing knowledge. For example the customer may also want a classifier to recognize birds. Rather than train a classifier with significant amounts of training data from all three classes, dogs, cats, and birds, the existing knowledge regarding the dogs and cats classes may be used along with a smaller set of training data for dogs and cats combined with a complete data set for birds. This allows the classifier to be completely trained using only subsets of training data for already trained classes with a complete set of training data for the class to be added, birds. In one example, the complete set of training data for birds may include 1000 images, while only 10 images apiece may be used for training the dogs and cats classes. These are just example numbers that may vary significantly in further embodiments, but do illustrate that a significant amount of prior training may be leveraged to extend the model to one or more additional classes. The amount of training data for each class is thus weighted based on the previously processed training data for the corresponding class. In various examples, 10 percent, or 1 percent, or less of the prior training data may comprise amount of training data that may be used for the subsets of data for which the classifier was previously trained.

While the example above is directed toward an image classifier, the leveraging of prior trained classes may be used to expand the number of classes in any type of classifier.

Example methods (e.g., algorithms) and systems (e.g., special-purpose machines) include a tool that easily allows any developer (even without ML knowledge) to build their own computer vision models. The customer/developer simply uploads images, such as a training set, and clicks a button to build their model.

Differentiators/innovations of this service include methods to efficiently expand existing models with additional classes to be recognized and may alternatively or inclusively methods to handle out-of-domain images (aka handling negative set images).

Training a neural network classifier may require a lot of training data. Extending a trained classifier to recognize new classes previously required storing all the old training data (for existing classes), combining them with new data (for new classes) and then re-training. Both storage and time cost are significant.

In one embodiment, the model parameters (weights and bias, etc.) are extracted from the existing/trained classifier and are fixed during the new classifier training process. A small portion of the old training data for the previously existing classes (for example, 10 samples per class, which are representative, instead of hundreds of them) plus new training data (hundreds of samples may be typical) for the new classes may be used during the new classifier training process. Because the overall number of training sample are reduced, and also part of the parameters are fixed, the whole training process may be accelerated. In some embodiments, the training time for adding classes may be accelerated by five to ten times. The resulting classifier may have similar/same accuracy to the classifier trained with the complete data.

FIG. 1 is a block flow diagram illustrating a method 100 of classifier training and the addition of a class to a trained classifier. A DatasetA at 110 includes image samples for class#1~class#N, each class may have hundreds or thousands of image samples. In one embodiment, datasetA 110 is a training set. A classifier1 at 115 is trained at 117 based on datasetA 110, which can be used to classify/predict an input image as belonging to class1, or class2, or classN.

Given another dataset B at 120, which contains more images samples for some new classes, e.g. classN+1, classN+2, . . . , classM, it is desired to update/train a classifier2 125, which can recognize all the classes, i.e. class1~classM. Typically, one would simply combine the datasets A 110 and B 120, and train a new classifier. This is slow, since both datasets A and B need to be used for training, and sometimes impossible since available computing resources may not be sufficient to store all the old data in datasetA plus the data in datasetB, such as on a mobile device, where memory may be limited.

To reduce the resources required to create a new classifier that is trained on both datasets, a small portion of datasetA is extracted at 130. The portion may be designated as, A', where A' is much smaller than A (e.g randomly select 10 images per class, or select the most representative images for each class, or, select the images which are more different to the images in datasetB, etc.). At 135. A' is combined with dataset B.

At 140, certain parameters, P, are parsed and extracted from classifier 115 (e.g. the FullyConnect8 layer, or even more layers above FullyConnect8 layer. The FullyConnect layer is part of the classifier1 which contains the information (parameters such as weights, bias, etc.) extracted/summarized from training datasetA. Compared to the training datasetA, the size of these parameters are much smaller.). At 145 classifier2 125 is initialized, and P is injected into this classifier with a "concat" layer, which is used to concatenate two sets of parameters, in this case, parameters from classifier1 and classifier2. At 150, the new classifier2 125 is trained with data A'+B. During this training, P is fixed using an operation, such as some configs. In one embodiment, the parameters corresponding to classN+1 . . . classM are optimized.

After the training is done, classifier2 at 125 results. A model surgery 155 may optionally be conducted to remove the "concat" layer and generate classifier3 at 160, which can now be used to classify images into class1~classM. "Model Surgery" means copying or updating some parameters of a trained classifier model. The classifier2 can be used to classify samples from class1~M, but it includes two sets of parameters for class1~N and classN+1~classM respectively. This classifier structure is different from the classifier trained from prior solutions (using all data from class1~classM), although their output/performance behavior are very similar or even the same. A "model surgery" may be conducted to mix these two sets of parameters, so that the classifier3's structure looks exactly the same to the classifiers trained from prior solution (using all data for training).

Classifier3 has similar accuracy to the classifier1 115 trained with prior solutions using complete training data from all classes. The training process doesn't require the complete dataset A, it may use a small portion of datasetA, which saves storage space. The training process may be much faster because only those parameters related to classN+1~classM may be optimized.

The extraction of parameters from an existing classifier, insertion of the extracted parameters to a new classifier (by a concat layer), fixing these parameters during new classifier training, and use small portion of old data plus all new data during the new classifier training, ensures the training process is efficient (fast) and effective (accurate).

When a customer or user trains a classifier, the classifier can only recognize the known classes, since the classifier is only trained on provided data. Thus, the accuracy of the classifier is limited. When a random image is submitted to the classifier, such as indicated at 165 for classifier1 the result can be unexpected. For example, if a classifier trained on dog images receives a human face, the classification results 170 can be unpredictable, sometimes embarrassing, as only classes 1-N may be predicted. However, with classifier3 160, random images 175 may be predicted as any of classes 1-M. which are less likely to appear unpredictable.

In prior efforts to support unseen classes, typically, some confidence/probability thresholds are used to reject "unknown/invalid" input images, if the predicted result has a lower score than this threshold. The use of a confidence threshold to reject a result can only partially solve the issue. For input images which are totally unrelated, or inappropriate (e.g. porn images), they can still pass the threshold and lead to unexpected/bad output. In one embodiment, a background database which contains thousands of general classes, so called "negative classes", is leveraged and combined with the customers' data to train a classifier which has much better background knowledge.

The "negative classes" may be carefully chosen from thousands of candidate classes by removing candidate classes which are too close to the target classes, since they will confuse/hurt the training. Similar negative classes may be merged to reduce the number of classes/sample required during training. Negative classes which are informative: i.e similar to the target classes (but not too similar) may be selected for use in training.

When an input image is classified as one of the "negative classes", the classifier can either output "not of the target classes" or "rejected". As a result, the trained classifier is much more "robust", i.e. precision is higher, recall is the same, even on random test set.

In one example, a classifier that is to be trained on customer training data consisting of images of cats and dogs as previously described. When the customer submits training data consisting of one or more classes, each piece of training data likely belongs to one of the one or more classes. In other words, the training data provided by the customer is likely highly relevant to the classes. This can be problematic when the trained classifier is used on an image provided the customer for classification. Given the prior example of the classifier being trained on the classes comprising dogs and cats, an image that is submitted for classification that does not contain an image of a dog or cat may appear to be randomly assigned to one of the cats and dogs classes. To solve this problem, while training the classifier with the customer provided images, additional images may be provided to reduce the appearance of random results.

In one embodiment, the additional training data may be selected such that they do not include images of cats or dogs, the classes that the classifier is being trained to recognize. Removal of cat and dog images from the additional training data may be done to ensure that the customer selected training data remains unbiased by the additional training data. In a further embodiment, candidate content for the additional training data has images removed that are very different from the dog and cat classes. For instance, training data that contains images of a house, or furniture may be removed. Various thresholds may be used to determine such very different additional training data. The additional training data may be referred to as negative classes, or classes that are different from the classes the classifier is being trained to recognize.

In further detail, a background database is leveraged, which contains thousands of general classes, so called "negative classes", and is combined with the users' data to train a classifier which has much better background knowledge.

Figure 2:
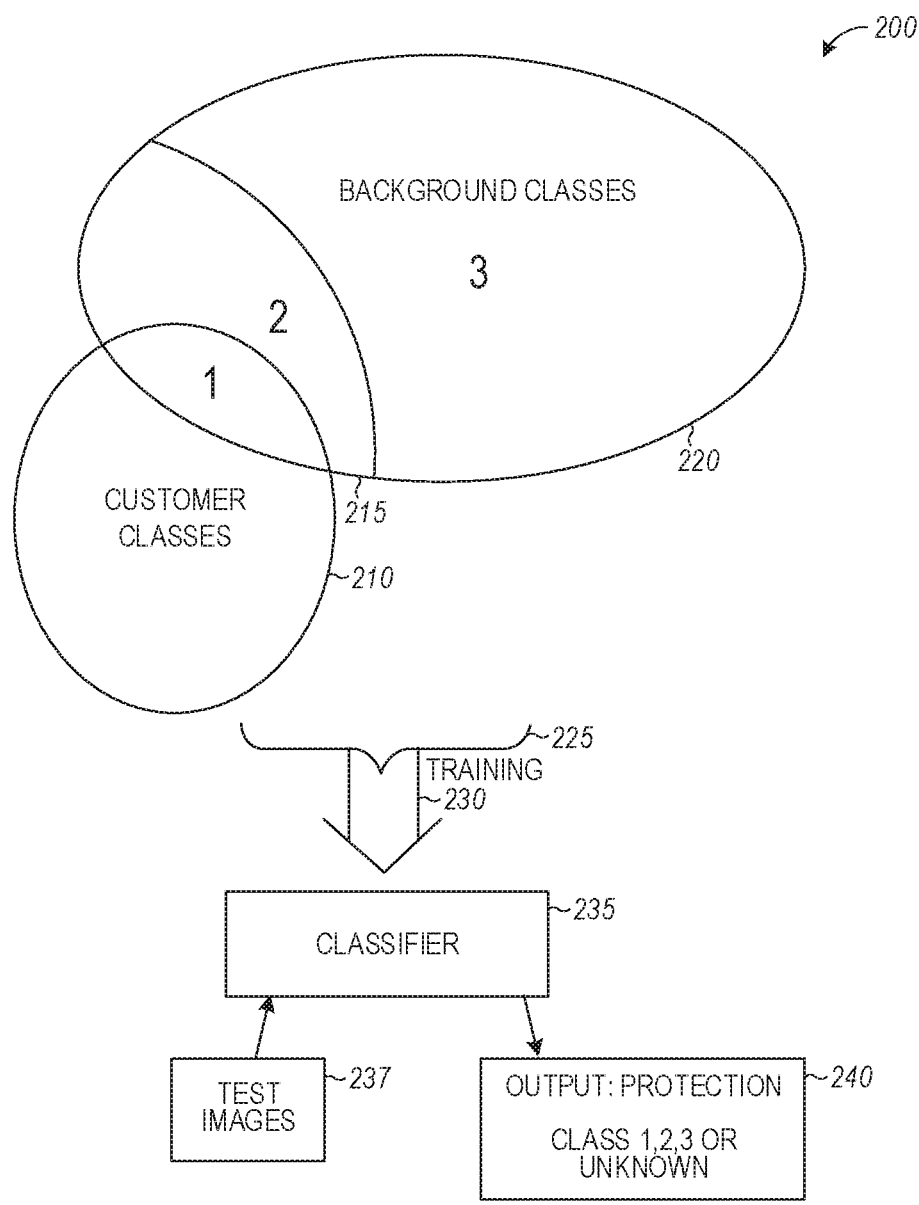
FIG. 2 is a block flow diagram of a method of training a classifier with customer data and negative classes to provide background knowledge to the classifier according to an example embodiment.

FIG. 2 is a block flow diagram of a method 200 of training a classifier with customer data 210 and negative classes 215 to provide better background knowledge to the classifier. The "negative classes" are carefully chosen from thousands of candidate "background" classes 220.

Candidate classes which are too close (indicated at 1) to the target classes, since they will confuse/hurt the training, are not selected as negative class as shown in the partial overlap of negative classes 215 with the candidate classes 220. Negative classes (indicated at 2) which are informative: i.e similar to the target classes (but not too similar) are selected. Further, candidate classes which are very different (indicated at 3) compared to the target classes 210, since they are not useful when training the classifier for target classes, are removed.

At 225, similar negative classes are merged to a fewer number of classes, but in one embodiment, the similar negative classes are not combined as a single negative class. Such merger can help reduce the total number of classes/ samples used for training at 230 of the classifier 235. When an input image 237 is classified as one of the "negative classes", the classifier 235 we can either output "not of the target classes" or "rejected" at 240. As a result, the trained classifier 235 is much more "robust", i.e. precision is higher, recall is the same, even on random test set.

Figure 3:
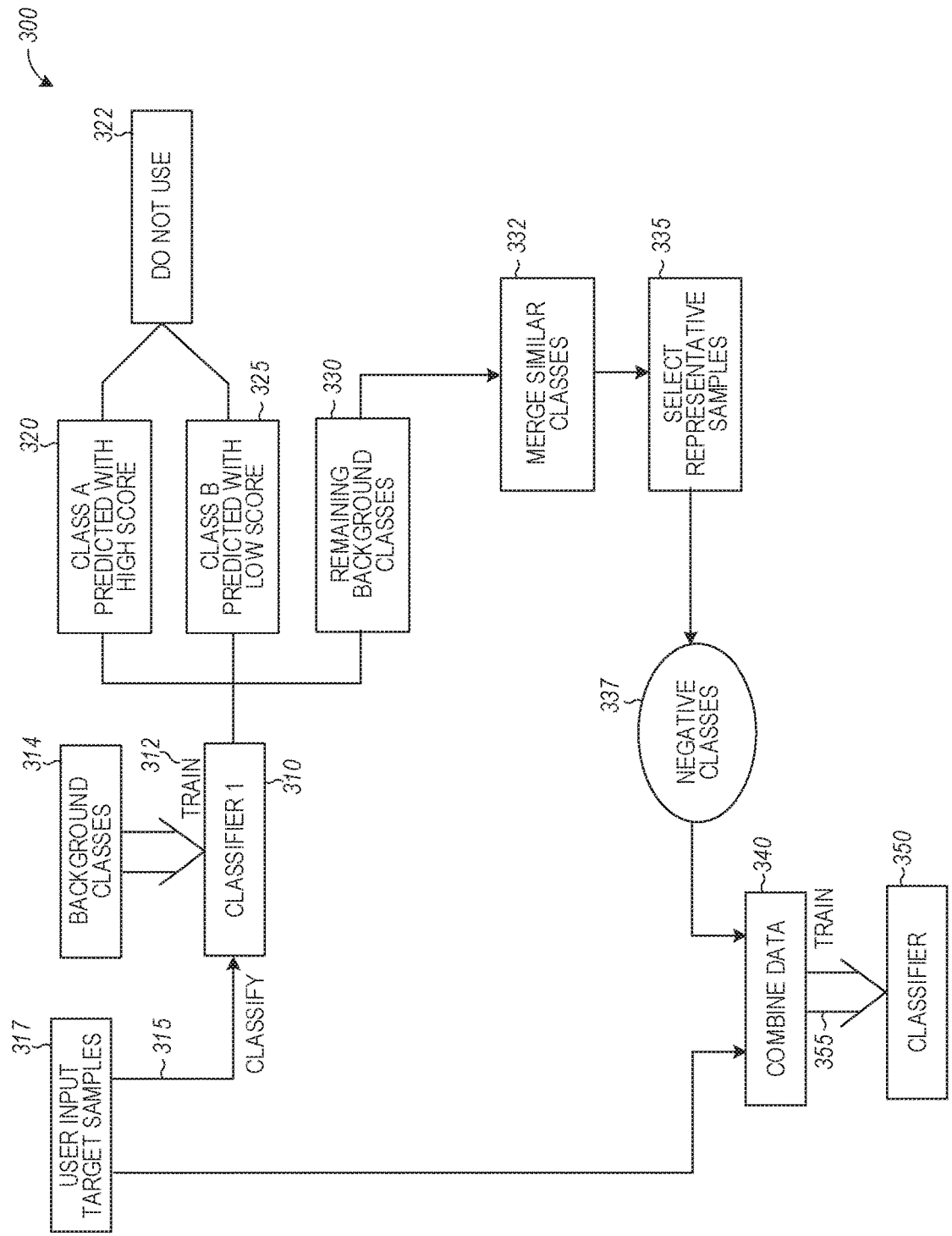
FIG. 3 is a block flow diagram of a method of selecting negative classes and training a classifier with customer data and the selected negative classes to provide better background knowledge to the classifier according to an example embodiment.

FIG. 3 is a block flow diagram of a method 300 of selecting negative classes and training a classifier with customer data and the selected negative classes to provide better background knowledge to the classifier. At 310, a classifier1 is trained at 312 with the data of all the background classes 314. At 315, the classifier1 is used to classify user input images (of target classes 317). At 320, if some input images are predicted as classA (in background classes) with high confidence score, which indicate that classA may be the same (or very similar) to one of the target classes, the class may be removed at 322 from the negative class list. In one embodiment, a high confidence score may be 0.8 out of 1. 0.8 is the threshold for a higher confidence, corresponding to 80% probability of being a correct classification. The threshold may be selected to be a different value in further embodiments, such as any value between 0.7 to 0.9 in a further embodiment, and may vary even further based on a particular application or desired level of training.

At 325. if input images are predicted as classB (in backround classes) with a lower confidence score, this indicate that classB is very different/unrelated to the target customer provided classes. These classes are also removed from negative class list at 322. In one embodiment, 0.01 or 1% is the threshold used for the lower confidence score. The threshold may be lower or higher in further embodiments, but may not overlap with the higher confidence threshold. At 330, for the remaining background classes, the classes which are similar to each other as determined by the distance between their class centroids being too small (i.e. <certain threshold), the classes are merged at 332. The resulting classes are now defined as a negative class list.

For each of the negative classes at 335, a small subset (e.g. 8~16 images) of its samples may be selected such as for example, randomly as shown at 337. Alternatively, various algorithms may be used to choose those most representative samples. At 340, the user input data 317 (for target classes) and negative samples 337 (for negative classes) are combined, and a classifier 350 is trained at 355 with the combined classes. The resulting classifier 350 can output target classes (i.e. class1~N), or the classID of negative classes. If the prediction is one of the negative classes, the trained classifier can output "unseen/unknown class", or nothing, as its prediction.

The classifier 350 trained in this manner can leverage a pre-built "background" dataset to enrich the training data. By selecting the "negative" classes/samples from "background" dataset, the resulting training data will help with the classifier training, instead of confusing the learner. The amount of data to use, or generate virtual samples, or shuffle the training data may be modified to balance the samples from input (positive) classes and negative classes and optimize training without adversely affecting the training provided by the positive classes, yet reducing results that appear random.

In a further embodiment, the negative classes may be added to an already trained classifier in the same manner as described with respect to FIG. 1.

Figure 4:
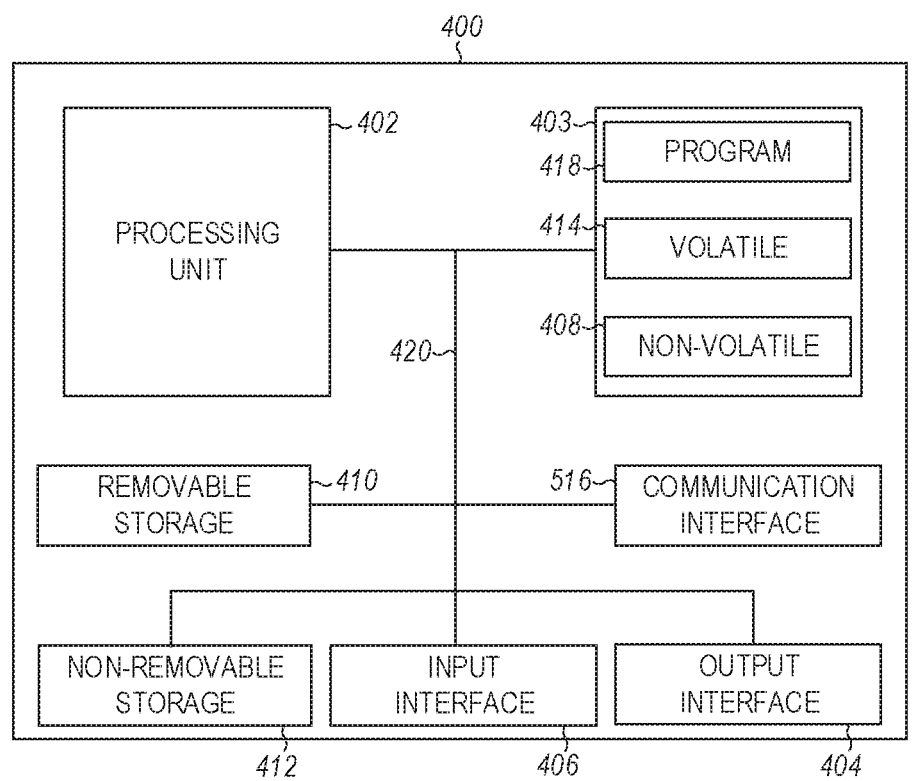
FIG. 4 is a block diagram of circuitry for example devices to perform methods and algorithms according to example embodiments.

FIG. 4 is a block schematic diagram of a computer system 400 to implement programming and modules to create classifiers utilizing methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, or other computing device including the same or similar elements as illustrated and described with regard to FIG. 4. Devices, such as smartphones, tablets, and smartwatches, are generally collectively referred to as mobile devices or user equipment. Further, although the various data storage elements are illustrated as part of the computer 400, the storage may also or alternatively include cloud-based storage accessible via a network, such as the Internet or server based storage.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM). erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406. output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software that, when executed by the processing unit 402, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 418 may be used to cause processing unit 402 to perform one or more methods or algorithms described herein.

EXAMPLES

1. A method comprising:
   obtaining training data for a classifier, the training data comprises one or more target classes;
   obtaining candidate background classes:
   selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes; and
   training the classifier on a combined set of the selected negative classes and target classes.

2. The method of example 1 and further comprising merging similar selected negative classes to a fewer number of selected negative classes to reduce the amount of training date.

3. The method of any of examples 1-2 wherein selecting negative classes comprises classifying training data from the target classes via a classifier trained on the candidate background cases.

4. The method of example 3, wherein training data from the target classes classified as a background class with high confidence is representative of the background class being excluded from the selected negative classes.

5. The method of any of examples 3-4, wherein training data from the target classes classified as a background class with low confidence is representative of the background class being excluded from the selected negative classes.

6. The method of any of examples 1-5 wherein the combined set of the selected negative classes and target classes includes a sample of the selected negative classes.

7. The method of example 6 wherein the sample of the selected negative classes comprises 8 to 16 samples per negative class.

8. the method of any of examples 1-7 wherein training the classifier comprises using parameters from a classifier trained on the target data and wherein the target classes of the combined set of classes is a subset of the target classes in addition to the selected negative classes.

9. A device comprising:
   a processor; and
   a memory device coupled to the processor and having a program stored thereon for execution by the processor to perform operations comprising:
      obtaining training data for a classifier, the training data comprises one or more target classes;
      obtaining candidate background classes;
      selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes; and
      training the classifier on a combined set of the selected negative classes and target classes.

10. The device of example 9 wherein the operations further comprise merging similar selected negative classes to a fewer number of selected negative classes to reduce the amount of training date.

11. The device of any of examples 9-10 wherein selecting negative classes comprises classifying training data from the target classes via a classifier trained on the candidate background cases.

12. The device of example 11. wherein training data from the target classes classified as a background class with high confidence is representative of the background class being excluded from the selected negative classes.

13. The device of any of examples 11-12, wherein training data from the target classes classified as a background class with low confidence is representative of the background class being excluded from the selected negative classes.

14. The device of any of examples 9-13 wherein the combined set of the selected negative classes and target classes includes a sample of the selected negative classes.

15. The device of example 14 wherein the sample of the selected negative classes comprises 8 to 16 samples per negative class.

16. A machine readable storage device has instructions for execution by a processor of a machine to cause the processor to perform operations comprising:
   obtaining training data for a classifier, the training data comprises one or more target classes;
   obtaining candidate background classes;
   selecting negative classes from the candidate background classes, wherein the negative classes exclude candidate background classes that are close to the target classes, wherein the negative classes exclude candidate background classes that are very different from the target classes, and wherein the negative classes include candidate background classes that are similar to the target classes; and
   training the classifier on a combined set of the selected negative classes and target classes.

17. The machine readable storage device of example 16 wherein the operations further comprise merging similar selected negative classes to a fewer number of selected negative classes to reduce the amount of training date.

18. The machine readable storage device of any of examples 15-16 wherein selecting negative classes comprises classifying training data from the target classes via a classifier trained on the candidate background cases.

19. The machine readable storage device of example 18, wherein training data from the target classes classified as a background class with high confidence is representative of the background class being excluded from the selected negative classes.

20. The machine readable storage device of any of examples 18-19, wherein training data from the target classes classified as a background class with low confidence is representative of the background class being excluded from the selected negative classes.

21. The machine readable storage device of any of examples 16-20 wherein the combined set of the selected negative classes and target classes includes a sample of the selected negative classes.

22. The machine readable storage device of example 21 wherein the sample of the selected negative classes comprises 8 to 16 samples per negative class.

Although a few embodiments have been described in detail above, other modifications are possible. For example, the logic flows depicted in the figures do not require the particular order shown, nor sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
obtaining a set of image input samples containing target image classes;
obtaining a set of image background samples containing background classes different from the target classes;
training a first neural network classifier on the image background samples;
classifying the image input samples containing target image classes via the trained first neural network classifier with a confidence score for the one or more image background classes;
selecting negative classes from the classified image input samples, wherein the selected negative classes exclude background classes of classified image input samples having confidence scores higher than a first threshold and wherein the selected negative classes exclude background classes of the classified input image samples having confidence scores lower than a second threshold wherein the second threshold is lower than the first threshold;
selecting image samples from the background samples corresponding to the selected negative classes; and
training a second neural network classifier on a combined set of the input image samples and image samples selected from the background samples to classify samples input to the second neural network classifier as one of the target classes or a negative class, reducing incorrect classification of input images.

2. The method of claim 1 and further comprising merging similar selected negative classes to a fewer number of selected negative classes to reduce an amount of background image samples used to train the second neural network classifier.

3. The method of claim 1, wherein the input image samples classified as having a confidence lower than the second threshold is representative of the background classes being excluded from the selected negative classes.

4. The method of claim 1, wherein the input image samples classified as having a confidence lower than the second threshold is representative of the background class being excluded from the selected negative classes.

5. The method of claim 1 wherein the first threshold is 0.7 or higher and the second threshold is 0.01 or lower.

6. A device comprising:
a processor; and
a memory device coupled to the processor and having a program stored thereon for execution by the processor to perform operations comprising:
obtaining a set of image input samples containing target image classes;
obtaining a set of image background samples containing background classes different from the target classes;
training a first neural network classifier on the image background samples;
classifying the image input samples containing target image classes via the trained first neural network classifier with a confidence score for the one or more image background classes;
selecting negative classes from the classified image input samples, wherein the selected negative classes exclude background classes of classified image input samples having confidence scores higher than a first threshold and wherein the selected negative classes exclude background classes of the classified input image samples having confidence scores lower than a second threshold wherein the second threshold is lower than the first threshold;
selecting image samples from the background samples corresponding to the selected negative classes; and
training a second neural network classifier on a combined set of the input image samples and image samples selected from the background samples to classify samples input to the second neural network classifier as one of the target classes or a negative class, reducing incorrect classification of input images.

7. The device of claim 6 wherein the operations further comprise merging similar selected negative classes to a fewer number of selected negative classes to reduce an amount of background samples used to train the second neural network classifier.

8. The device of claim 6, wherein the input image samples classified as having a confidence lower than the second threshold is representative of the background classes being excluded from the selected negative classes.

9. The device of claim 6, wherein the input image samples classified as having a confidence lower than the second threshold is representative of the background class being excluded from the selected negative classes.

10. The device of claim 6 wherein the first threshold is 0.7 or higher and the second threshold is 0.01 or lower.

11. The device of claim 10 wherein the selected image samples from the background image samples corresponding to the selected negative classes comprise 8 to 16 samples per selected negative class.

12. A machine readable storage device having instructions for execution by a processor of a machine to cause the processor to perform operations comprising:
obtaining a set of image input samples containing target image classes;
obtaining a set of image background samples containing background classes different from the target classes;
training a first neural network classifier on the image background samples;
classifying the image input samples containing target image classes via the trained first neural network classifier with a confidence score for the one or more image background classes;
selecting negative classes from the classified image input samples, wherein the selected negative classes exclude background classes of classified image input samples having confidence scores higher than a first threshold and wherein the selected negative classes exclude background classes of the classified input image samples having confidence scores lower than a second threshold wherein the second threshold is lower than the first threshold;
selecting image samples from the background samples corresponding to the selected negative classes; and
training a second neural network classifier on a combined set of the input image samples and image samples selected from the background samples to classify samples input to the second neural network classifier as one of the target classes or a negative class, reducing incorrect classification of input images.

13. The machine readable storage device of claim 12 wherein the operations further comprise merging similar the selected negative classes to a fewer number of selected negative classes to reduce an amount of background samples used to train the second neural network classifier.

14. The machine readable storage device of claim 12, wherein the input image samples classified as having a confidence lower than the second threshold is representative of the background classes being excluded from the selected negative classes.

15. The machine readable storage device of claim 12, wherein the input image samples classified as having a confidence lower than the second threshold is representative of the background class being excluded from the selected negative classes.

16. The machine readable storage device of claim 12 wherein the first threshold is 0.7 or higher and the second threshold is 0.01 or lower.

17. The method of claim 1 wherein the background image samples contain thousands of images from thousands of background classes.

18. The method of claim 1 wherein the input image samples contain thousands of images from thousands of target image classes.

19. The method of claim 1 wherein the background samples contain images from thousands of background classes.

20. The method of claim 1 wherein the image sample comprise faces.

* * * * *